US010696139B2

(12) United States Patent
Benedict

(10) Patent No.: US 10,696,139 B2
(45) Date of Patent: Jun. 30, 2020

(54) RETURN AIR INTAKE GRILLE DE-ICING METHOD

(71) Applicant: CARRIER CORPORATION, Palm Beach Gardens, FL (US)

(72) Inventor: Thomas J. Benedict, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 111 days.

(21) Appl. No.: 16/082,683

(22) PCT Filed: Mar. 7, 2017

(86) PCT No.: PCT/US2017/021115
§ 371 (c)(1),
(2) Date: Sep. 6, 2018

(87) PCT Pub. No.: WO2017/155965
PCT Pub. Date: Sep. 14, 2017

(65) Prior Publication Data
US 2019/0092129 A1 Mar. 28, 2019

Related U.S. Application Data

(60) Provisional application No. 62/304,531, filed on Mar. 7, 2016.

(51) Int. Cl.
*B60H 1/32* (2006.01)
*F25D 21/00* (2006.01)
(Continued)

(52) U.S. Cl.
CPC ......... *B60H 1/321* (2013.01); *B60H 1/00785* (2013.01); *B60H 1/3232* (2013.01);
(Continued)

(58) Field of Classification Search
CPC .. B60H 1/00785; B60H 1/321; B60H 1/3232; F25D 11/003; F25D 21/006; F25D 21/008; F25D 21/06; F25D 21/08
See application file for complete search history.

(56) References Cited

U.S. PATENT DOCUMENTS

| 4,646,529 A | 3/1987 | Hanson |
| 4,949,550 A | 8/1990 | Hanson |

(Continued)

FOREIGN PATENT DOCUMENTS

| CN | 101704361 A | 5/2010 |
| DE | 102008033116 A1 | 3/2009 |

(Continued)

OTHER PUBLICATIONS

Enhai Liu, et al; Flow Field Analysis and Defrosting Cycle Optimization in a Large-scale Industrial Cold-Storage Facility; Journal of Food and Nutrition Research; 2014 2 (9); pp. 567-574.

(Continued)

*Primary Examiner* — Marc E Norman
(74) *Attorney, Agent, or Firm* — Cantor Colburn LLP

(57) ABSTRACT

A method (300) of de-icing a return air intake of a transport refrigeration system is provided. The method comprises using a controller for controlling the refrigeration system; determining (306) when de-icing mode is required; deactivating (308) an evaporator and an evaporator fan of the refrigeration system when de-icing mode is required; activating (310) a heater when de-icing mode is required; adjusting (312) the temperature of the heater to a selected temperature; deactivating (314) the heater when the heater has reached the selected temperature; and permitting (316) the refrigeration system to remain deactivated for a selected time period.

18 Claims, 3 Drawing Sheets

(51) Int. Cl.
  *F25D 21/08* (2006.01)
  *F25D 11/00* (2006.01)
  *B60H 1/00* (2006.01)

(52) U.S. Cl.
  CPC .......... *F25D 11/003* (2013.01); *F25D 21/006* (2013.01); *F25D 21/008* (2013.01); *F25D 21/08* (2013.01)

(56) References Cited

U.S. PATENT DOCUMENTS

| | | | |
|---|---|---|---|
| 5,201,185 | A | 4/1993 | Hanson et al. |
| 6,324,853 | B1* | 12/2001 | Kelly .................... F25D 21/008 62/151 |
| 6,609,388 | B1 | 8/2003 | Hanson |
| 7,032,395 | B2 | 4/2006 | Hanson et al. |
| 9,297,578 | B2 | 3/2016 | Fulmer et al. |
| 2003/0202557 | A1* | 10/2003 | Hanson .................. B60H 1/321 374/109 |
| 2006/0248904 | A1* | 11/2006 | Ludwig .............. B60H 1/00014 62/151 |
| 2012/0318006 | A1 | 12/2012 | Liu et al. |
| 2013/0014521 | A1 | 1/2013 | Lukasse et al. |
| 2013/0014522 | A1 | 1/2013 | Lukasse et al. |
| 2013/0014527 | A1 | 1/2013 | Lukasse et al. |
| 2013/0086929 | A1 | 4/2013 | Senf, Jr. |
| 2014/0123690 | A1 | 5/2014 | Hanley et al. |
| 2016/0101674 | A1 | 4/2016 | Riviere et al. |
| 2017/0184333 | A1* | 6/2017 | Lukasse ............... B60H 1/3232 |

FOREIGN PATENT DOCUMENTS

| | | |
|---|---|---|
| WO | 2013082401 A1 | 6/2013 |
| WO | 2016000750 A1 | 1/2016 |
| WO | 2016029092 A1 | 2/2016 |

OTHER PUBLICATIONS

Notification of Transmittal of the International Search Report and The Written Opinion of the International Searching Authority, or the Declaration for the International Application of PCT/US2017/02115; dated May 31, 2017; Report Received Date: Jun. 5, 2017.

* cited by examiner

RETURN AIR INTAKE GRILLE DE-ICING METHOD

BACKGROUND OF THE DISCLOSURE

The embodiments herein generally relate to transport refrigeration systems and more specifically, the method and apparatus for de-icing a return air intake of such systems.

Typically, transport refrigeration systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, transport refrigeration systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "all electric" transport refrigeration system for a refrigerated trailer application is also commercially available through Carrier Corporation headquartered in Farmington, Conn., USA. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the refrigeration unit and also powering electric AC fan motors for driving the condenser and evaporator motors and electric heaters associated with the evaporator. For example, U.S. Pat. No. 6,223,546 discloses an all electric transport refrigeration system.

Some transport refrigeration systems carry perishable cargo that expels water vapor, thus increasing the humidity within the refrigerated cargo space. The water vapor may freeze into ice on a return air intake as it flows into the refrigeration unit. Ice buildup may lead to blockages of the return air intake, thus inhibiting performance of the refrigeration unit and the transport refrigeration system.

BRIEF DESCRIPTION OF THE DISCLOSURE

According to one embodiment, a method of de-icing a return air intake of a transport refrigeration system is provided. The method comprises controlling, using a controller, a first plurality of components of the refrigeration system. The first plurality comprising at least one of a refrigerant heat absorption heat exchanger, a fan for the refrigerant heat absorption heat exchanger, and a heater. The method also comprises determining, using the controller, when a de-icing mode is required; and deactivating, using the controller, a second plurality of components of the refrigeration system when the de-icing mode is required. The second plurality comprising the refrigerant heat absorption heat exchanger and the fan for the refrigerant heat absorption heat exchanger. The method further comprises activating, using the controller, the heater when the de-icing mode is required; adjusting, using the controller, the temperature of the heater to a selected temperature; deactivating, using the controller, the heater when the heater has reached the selected temperature; and permitting, using the controller, the second plurality of components of refrigeration system to remain deactivated for a selected time period.

In addition to one or more of the features described above, or as an alternative, further embodiments of the method may include reactivating, using the controller, the second plurality of components of the refrigeration system after the selected time period.

In addition to one or more of the features described above, or as an alternative, further embodiments of the method may include that the heater is located below the return air intake.

In addition to one or more of the features described above, or as an alternative, further embodiments of the method may include that the heater is an electric resistance heater.

In addition to one or more of the features described above, or as an alternative, further embodiments of the method may include that the selected temperature is about 90° F. (32.22° C.).

In addition to one or more of the features described above, or as an alternative, further embodiments of the method may include that the selected time period is about 10 minutes.

According to another embodiment, a controller of a transport refrigeration system is provided. The controller comprising: a processor; a memory comprising computer-executable instructions that, when executed by the processor, cause the processor to perform operations. The operations comprise: controlling a first plurality of components of the refrigeration system. The first plurality comprising at least one of a refrigerant heat absorption heat exchanger, a fan for the refrigerant heat absorption heat exchanger, and a heater. The operations also comprise determining when a de-icing mode is required and deactivating a second plurality of components of the refrigeration system when the de-icing mode is required. The second plurality comprising the refrigerant heat absorption heat exchanger and the fan for the refrigerant heat absorption heat exchanger. The operations further comprise activating the heater when the de-icing mode is required; adjusting the temperature of the heater to a selected temperature; deactivating the heater when the heater has reached the selected temperature; and permitting the second plurality of components of refrigeration system to remain deactivated for a selected time period.

In addition to one or more of the features described above, or as an alternative, further embodiments of the controller may include that the operations further comprise reactivating the second plurality of components of the refrigeration system after the selected time period.

In addition to one or more of the features described above, or as an alternative, further embodiments of the controller may include that the heater is located below the return air intake.

In addition to one or more of the features described above, or as an alternative, further embodiments of the controller may include that the heater is an electric resistance heater.

In addition to one or more of the features described above, or as an alternative, further embodiments of the controller may include that the selected temperature is about 90° F. (32.22° C.).

In addition to one or more of the features described above, or as an alternative, further embodiments of the controller may include that the selected time period is about 10 minutes.

According to another embodiment, a computer program computer program product tangibly embodied on a computer readable medium, the computer program product including instructions that, when executed by a processor, cause the processor to perform operations is provided. The operations comprise controlling a first plurality of components of the refrigeration system. The first plurality comprising at least one of a refrigerant heat absorption heat exchanger, a fan for the refrigerant heat absorption heat exchanger, and a heater. The operations also comprise determining when a de-icing mode is required; and deactivating a second plurality of components of the refrigeration system when the de-icing mode is required. The second plurality comprising the refrigerant heat absorption heat exchanger and the fan for the refrigerant heat absorption heat exchanger. The operations further comprise activating the heater when the de-icing mode is required; adjusting the temperature of the heater to a selected temperature; deactivating the heater when the heater has reached the selected temperature; and permitting the second plurality of components of refrigeration system to remain deactivated for a selected time period.

In addition to one or more of the features described above, or as an alternative, further embodiments of the computer program may include that operations further comprise reactivating the second plurality of components of the refrigeration system after the selected time period.

In addition to one or more of the features described above, or as an alternative, further embodiments of the computer program may include that the heater is located below the return air intake.

In addition to one or more of the features described above, or as an alternative, further embodiments of the computer program may include that the heater is an electric resistance heater.

In addition to one or more of the features described above, or as an alternative, further embodiments of the computer program may include that the selected temperature is about 90° F. (32.22° C.).

In addition to one or more of the features described above, or as an alternative, further embodiments of the computer program may include that the selected time period is about 10 minutes.

Technical effects of embodiments of the present disclosure include de-icing a return air inlet of a transport refrigeration system by deactivating the transport refrigeration system, activating a heater to a selected temperature, turning off the heater, and allowing the heat to rise from the heater to the return air inlet for a selected time period.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
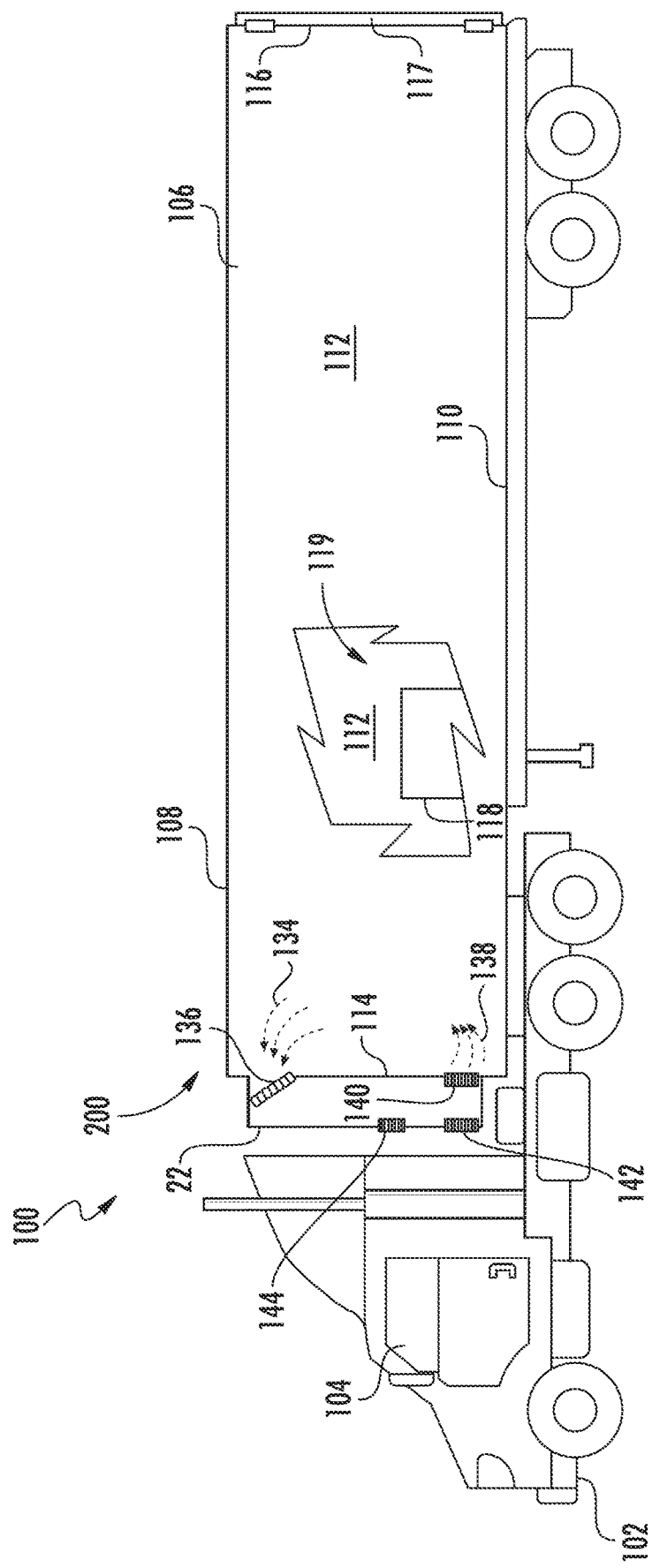
FIG. 1 is a schematic illustration of a transport refrigeration system, according to an embodiment of the present disclosure.
Figure 2:
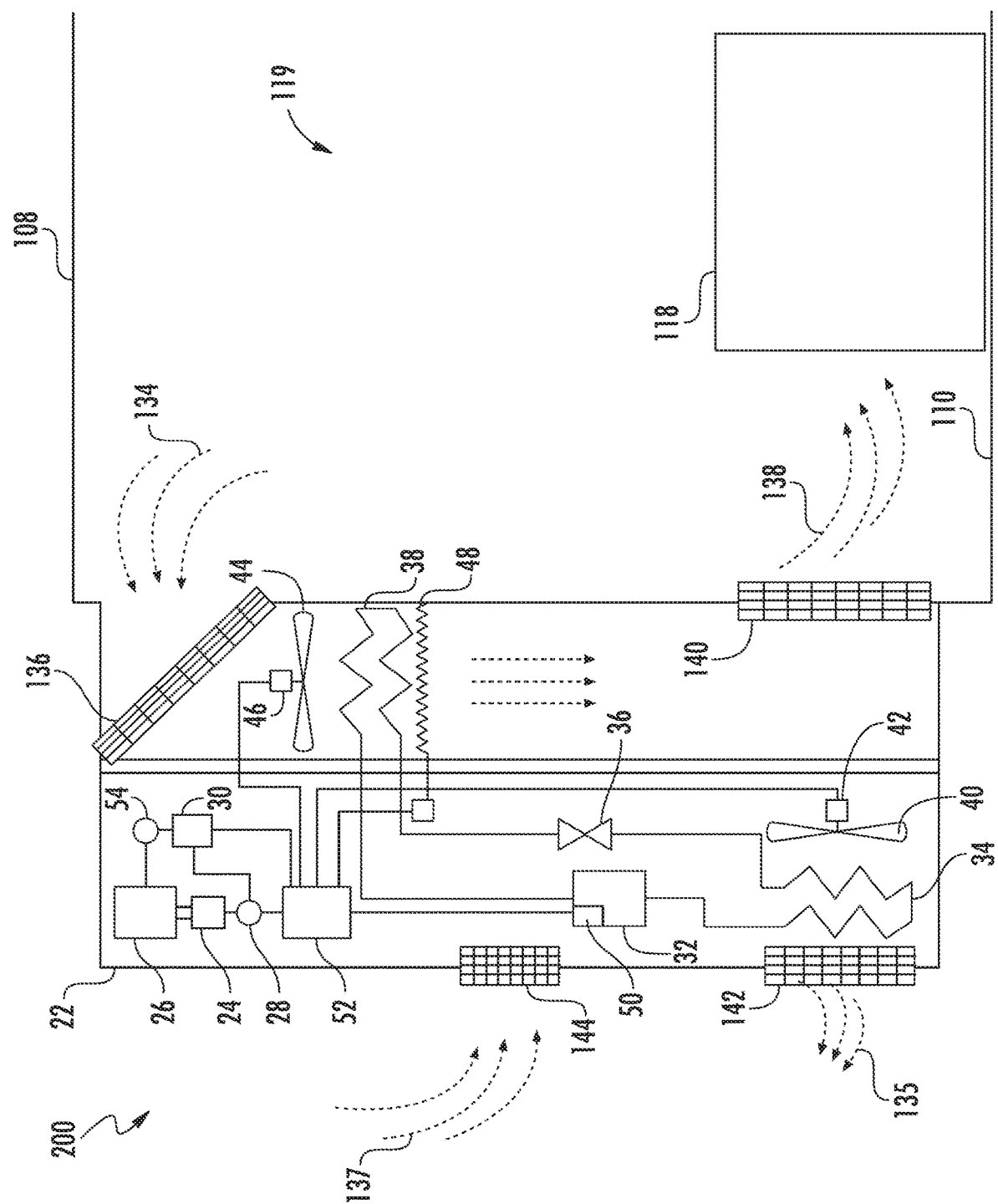
FIG. 2 is an enlarged schematic illustration of the transport refrigeration system of FIG. 1, according to an embodiment of the present disclosure.

Referring to FIGS. 1 and 2. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure. The transport refrigeration system 200 is being illustrated as a trailer system 100 as seen in FIG. 1. The trailer system 100 includes a tractor 102 and a transport container 106. The tractor 102 includes an operator's compartment or cab 104 and an engine (not shown), which acts as the drive system of the trailer system 100. The transport container 106 is coupled to the tractor 102. The transport container 106 is a refrigerated trailer and includes a top wall 108, a directly opposed bottom wall 110, opposed side walls 112, and a front wall 114, with the front wall 114 being closest to the tractor 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to shipping containers that are shipped by rail, sea, or any other suitable container, without use of a tractor 102.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring refrigerated transport. The transport refrigeration system 200 includes a refrigeration unit 22, an electric generation device 24, a prime mover 26 for driving the electric generation device 24, and a controller 30. The refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions to the interior compartment 119. In an embodiment, the refrigeration unit 22 is a refrigeration system capable of providing a desired temperature and humidity range.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from the return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 also includes a controller 30 configured for controlling operation of the transport refrigeration system 200 including, but not limited to, operation of various components of the refrigerant unit 22 to provide and maintain a desired thermal environment within the refrigerated cargo space 119. The controller 30 may be an electronic controller including a processor and an associated memory comprising computer-executable instructions that, when executed by the processor, cause the processor to perform various operations. The a processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The controller 30 controls operation of various components of the refrigerant unit 22, such as the refrigerant compression device 32 and its associated drive motor 50, the fan motors 42, 46 and the electric resistance heater 48. The controller 30 may also be also to selectively operate the prime mover 26, typically through an electronic engine controller 54 operatively associated with the prime mover 26.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger 38. The heater 48 may also be used to de-ice the return air intake 136, as described further below.

The prime mover 26, which comprises an on-board fossil-fuel engine, most commonly a diesel engine, drives the electric generation device 24 that generates electrical power. The drive shaft of the engine drives the shaft of the electric generation device 24. In an electrically powered embodiment of the refrigeration unit 20, the electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

Airflow is circulated into and through the refrigerate cargo space 119 of the transport container 106 by means of the refrigeration unit 22. A return airflow 134 flows into the refrigeration unit 22 from the refrigerated cargo space 119 through a refrigeration unit return air intake 136, and across a refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through a refrigeration unit outlet 140, which in some embodiments is located near the bottom wall 110 of the container system 106. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34. The supply airflow 138 cools the perishable goods 118 in the refrigerated cargo space 119 of the transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

Figure 3:
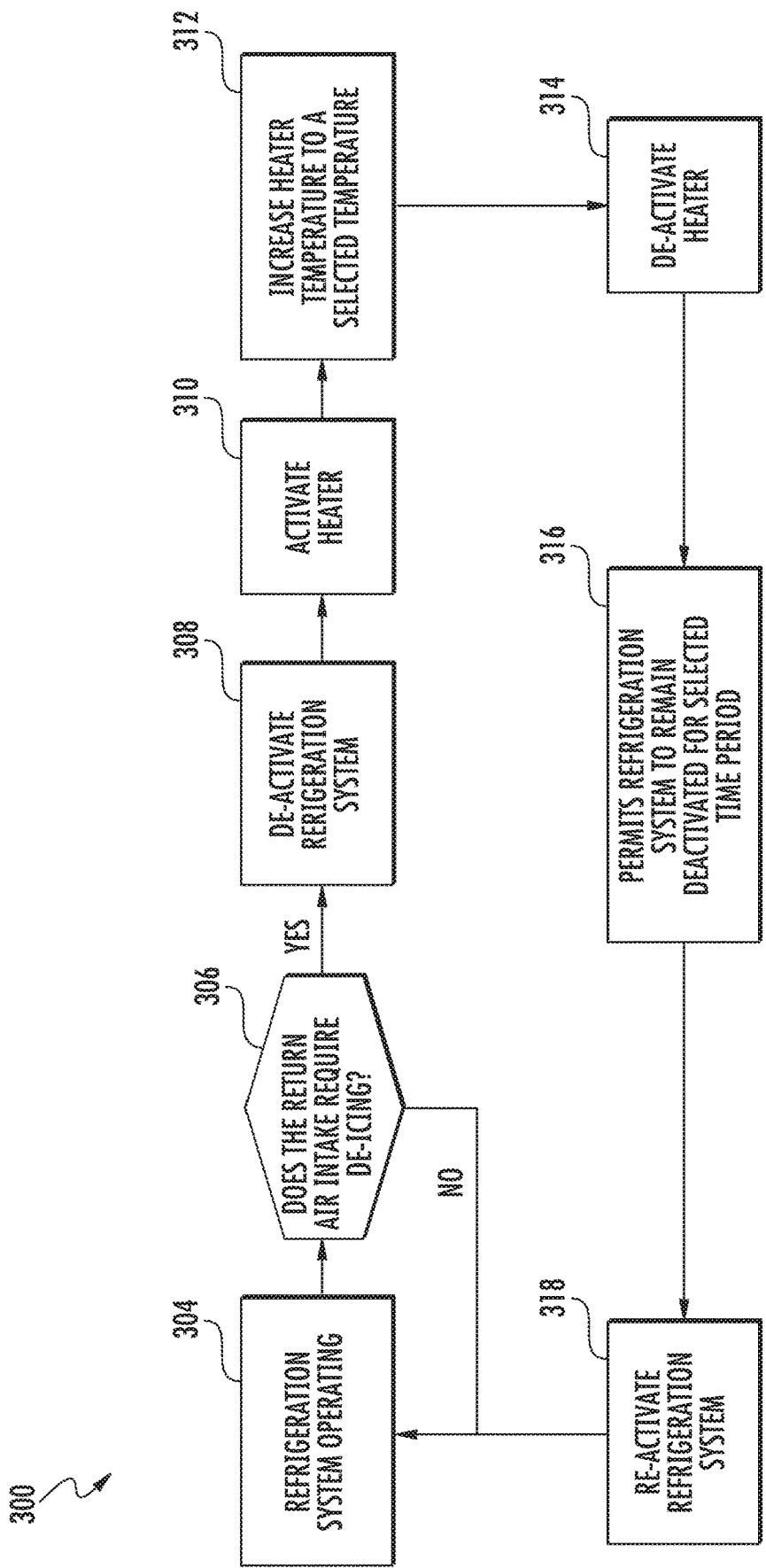
FIG. 3 is a flow diagram illustrating a method of de-icing a return air intake of the transport refrigeration system of FIG. 1, according to an embodiment of the present disclosure.

Referring now also to FIG. 3, which shows a flow diagram illustrating a method 300 of de-icing a return air intake 136 of the transport refrigeration system 200 of FIG. 1. Perishable cargo 118 may expel water vapor increasing the humidity within the refrigerated cargo space 119. The water vapor may freeze into ice on the return air intake 136 as return airflow 134 flows into the refrigeration unit 22. Ice buildup may lead to blockages of the return air intake 136, thus inhibiting performance of the refrigeration unit 22 and the transport refrigeration system 200. FIG. 3 illustrates a method 300 for de-icing the return air intake 136 and begins at block 304 with the transport refrigeration system 200 operating under the control of the controller 30. In an embodiment, the controller 30 may control a first plurality of components of the refrigeration system 200. The first plurality may comprise at least one of a refrigerant heat absorption heat exchanger 38, a fan 44 for the refrigerant heat absorption heat exchanger 38, and a heater 48.

At block 306, the controller 30 determines when a de-icing mode for the return air intake 136 is required. The controller 30 may determine that a de-icing mode for the return air intake 136 is required based on a periodic time based de-icing schedule. The de-icing schedule may be adjusted based upon how long a previous de-icing mode lasted. Alternatively, the controller 30 may determine that a de-icing mode for the return air intake 136 is required based on a measured temperature. The measured temperature may be taken at various locations throughout the transport refrigeration system 200 including but not limited to the return air intake 136, the fan 44, the heat absorption heat exchanger 38, and/or within the refrigerated transport container 119. The controller 30 may also determine that a de-icing mode for the return air intake 136 is required based a pressure drop at the return air intake 136 and/or anywhere else in the air flow path through the refrigeration unit 22. A pressure drop in air flow path through the refrigeration unit 22 may indicate a decrease in the volume of air flow through the refrigeration unit 22. For instance, ice formation on the return air intake 136 will reduce cross sectional area for the return airflow 134 to flow through, thus reducing pressure.

If the controller 30 determines that the return air intake 136 does not require de-icing at block 306, the method 300 will return to the normal operation at block 304. If the controller 30 determines that the return air intake 136 does require a de-icing mode, then the controller 30 will first proceed by deactivating components of the transport refrigeration system 200 not required for the de-icing mode, at block 308. In an embodiment, a second plurality of components of the refrigeration unit may be deactivated by the controller 30 when the de-icing mode is required. The second plurality of components may comprise the refrigerant heat absorption heat exchanger 38 and the fan 44 for the refrigerant heat absorption heat exchanger 38. The heat absorption heat exchanger 38 and the fan 44 should be deactivated during the de-icing mode because they will draw heat away from the return air intake 136, where it is needed for de-icing. Next at block 310, the controller 30 activates the heater 48 when the de-icing mode is required and then adjusts the temperature of the heater 48 to a selected temperature at block 312. In an embodiment, the selected temperature for the heater 48 may be about 60°-78° F. (15.56°-25.56° C.). In another embodiment, the selected temperature for the heater 48 may be about 90° F. (32.22° C.).

In the illustrated embodiment, the heater 48 is located below the return air intake 136 as seen in FIG. 2. The position of the heater 48 relative to the return air intake 136 allows the heat generated by the heater 48 to rise and de-ice the return air intake 136. Next, the controller 30 deactivates the heater 48 when the heater 48 has reached the selected temperature at block 314. Subsequently, the controller 30 permits the refrigeration system 200 to remain deactivated for a selected time period at block 316. The selected time period allows the heat to rise from the heater 48, which is also currently deactivated, and de-ice the return air intake 136 without requiring more energy to be added to the heater 48. In an embodiment, the second plurality of components of refrigeration system 200 may remain deactivated for the selected time period. In another embodiment, the selected time period is about 10 minutes. Finally, at block 318 the controller 30 reactivates the refrigeration system 200 after the selected time period and allows the refrigeration system 200 to resume operation at block 304. In an embodiment, controller 30 may reactivate the second plurality of components of the refrigeration system 200 at block 318.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of de-icing a return air intake of a transport refrigeration system, the method comprising:
controlling, using a controller, a first plurality of components of the refrigeration system, the first plurality comprising at least one of a refrigerant heat absorption heat exchanger, a fan for the refrigerant heat absorption heat exchanger, and a heater;

determining, using the controller, when a de-icing mode is required;

deactivating, using the controller, a second plurality of components of the refrigeration system when the de-icing mode is required, the second plurality comprising the refrigerant heat absorption heat exchanger and the fan for the refrigerant heat absorption heat exchanger;

activating, using the controller, the heater when the de-icing mode is required;

adjusting, using the controller, the temperature of the heater to a selected temperature;

deactivating, using the controller, the heater when the heater has reached the selected temperature; and permitting, using the controller, the second plurality of components of refrigeration system to remain deactivated for a selected time period.

2. The method of claim 1, further comprising:
reactivating, using the controller, the second plurality of components of the refrigeration system after the selected time period.

3. The method of claim 1, wherein:
the heater is located below the return air intake.

4. The method of claim 1, wherein:
the heater is an electric resistance heater.

5. The method of claim 1, wherein:
the selected temperature is about 90° F. (32.22° C.).

6. The method of claim 1, wherein:
the selected time period is about 10 minutes.

7. A controller of a transport refrigeration system comprising:
a processor;
a memory comprising computer-executable instructions that, when executed by the processor, cause the processor to perform operations, the operations comprising:
controlling a first plurality of components of the refrigeration system, the first plurality comprising at least one of a refrigerant heat absorption heat exchanger, a fan for the refrigerant heat absorption heat exchanger, and a heater;
determining when a de-icing mode is required;
deactivating a second plurality of components of the refrigeration system when the de-icing mode is required, the second plurality comprising the refrigerant heat absorption heat exchanger and the fan for the refrigerant heat absorption heat exchanger;
activating the heater when the de-icing mode is required;
adjusting the temperature of the heater to a selected temperature;
deactivating the heater when the heater has reached the selected temperature; and permitting the second plurality of components of refrigeration system to remain deactivated for a selected time period.

8. The controller of claim 7, wherein the operations further comprise:
reactivating the second plurality of components of the refrigeration system after the selected time period.

9. The controller of claim 7, wherein:
the heater is located below the return air intake.

10. The controller of claim 7, wherein:
the heater is an electric resistance heater.

11. The controller of claim 7, wherein:
the selected temperature is about 90° F. (32.22° C.).

12. The controller of claim 7, wherein:
the selected time period is about 10 minutes.

13. A computer program product tangibly embodied on a computer readable medium, the computer program product including instructions that, when executed by a processor, cause the processor to perform operations comprising:
controlling a first plurality of components of the refrigeration system, the first plurality comprising at least one of a refrigerant heat absorption heat exchanger, a fan for the refrigerant heat absorption heat exchanger, and a heater;
determining when a de-icing mode is required;
deactivating a second plurality of components of the refrigeration system when the de-icing mode is required, the second plurality comprising the refrigerant heat absorption heat exchanger and the fan for the refrigerant heat absorption heat exchanger;
activating the heater when the de-icing mode is required;
adjusting the temperature of the heater to a selected temperature;
deactivating the heater when the heater has reached the selected temperature; and permitting the second plurality of components of refrigeration system to remain deactivated for a selected time period.

14. The computer program of claim 13, wherein the operations further comprise:
reactivating the second plurality of components of the refrigeration system after the selected time period.

15. The computer program of claim 13, wherein:
the heater is located below the return air intake.

16. The computer program of claim 13, wherein:
the heater is an electric resistance heater.

17. The computer program of claim 13, wherein:
the selected temperature is about 90° F. (32.22° C.).

18. The computer program of claim 13, wherein:
the selected time period is about 10 minutes.

* * * * *